United States Patent Office 2,906,666
Patented Sept. 29, 1959

2,906,666

THERAPEUTIC MELLITIC ACID COMPOSITIONS

Pierre Wirth, Paris, France, assignor to Frank E. Jonas, New York, N.Y.

No Drawing. Application July 5, 1957
Serial No. 669,946

9 Claims. (Cl. 167—65)

The present invention relates to therapeutic applications of mellitic acid and sodium mellate as well as products useful for these applications, such as pharmaceutical and veterinary products.

Mellitic acid, mellic acid or benzene hexacarboxylic acid, is a product which, as a chemical compound, has already been described some time ago in the literature and is mentioned in most treatises on organic chemistry. It exhibits in effect the curious property of yielding a crystalline aluminum salt which has long intrigued mineralogist, since it is one of those rare minerals formed with an organic acid.

It exists in the natural state in the form of mellite (aluminum mellate) in certain ores, particularly in Bohemia, and corresponds to a fossilization of certain soils rich in lignite and in carboniferous deposits.

Its empirical formula is $C_6(COOH)_6$ or $C_{12}H_6O_{12}$.

Its molecular weight is 342 and its structural formula is:

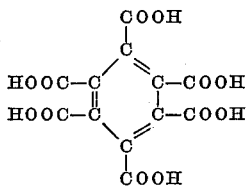

By evaporation of its aqueous solution, mellitic acid is obtained as a yellowish-white powder having a scarcely crystalline appearance.

The acid begins to decompose at 260° C. and in a closed tube it melts at 286–288° C. It is also rather soluble in water at 15°, slightly soluble in absolute alcohol, very soluble in alcohol at 50°, scarcely soluble in ether, soluble in alkaline solutions, and soluble in boiling sulfuric acid without decomposition.

It does not lose water at 100° C. At a more elevated temperature it produces a crystalline sublimate. By reaction with soda, it gives sodium mellate.

Applicant has discovered the pharmacological activity of mellitic acid and sodium mellate, an activity which has not been heretofore known or reported, and has produced therefrom useful pharmaceutical and veterinary preparations.

This activity reveals itself as particularly interesting, both as a diuretic and as a choleretic, at extremely low dosages and notably in dosages of the order of 0.5 mg. per day for an adult.

Tests on animals, conducted at a dosage of 0.04 mg. per kilogram of animal weight, have shown that diuresis increases at least 50% after 48 hours of treatment; and as to choleresis it is established that after the same period of time there is an acceleration of biliary discharge of the order of 25%.

Systematic unpublished investigations, carried out in human pathology, have led to the following being established: if on a normal subject the diuretic action often seems weak, and requires to be made evident by very precise conditions of observation, on the contrary, in asystolic, oliguric or edematous patients, the product effects in nearly all cases an abundant diuresis. This often takes several days to be established. Once perceptible, it persists throughout the treatment, almost always up to a point of complete dehydration of all the peripheral and visceral edemas. This diuretic action has, moreover, been obtained outside of any cardiotonic treatment.

It can be noted that this effect of mellitic acid (or its salt sodium mellate) is perceptibly different from that of the mercurial diuretics: in the case of mellitic acid, this effect is slower to appear and does not manifest itself by polyuria for some hours, but its action after once under way appears considerable and constant up to consistently complete disappearance of the retained water.

In cases of spongiose obesity, treatment with mellitic acid or sodium mellate brings about a very clear reducing effect due to the dehydration of the subcutaneous oily cellular tissues.

As to its choleretic action in human pathology, this has been shown in the course of clinical tests by an acceleration of biliary discharge, varying according to the individual, and being between a 10–30% increase in the discharge. In the course of these tests, it has equally been possible to show a perceptible lowering of the cholesterol plasma in hypercholesteremic patients.

Finally, it is emphasized that in the course of all the clinical tests there has been established, particularly in patients with anorexia, an extremely clear revival of appetite.

Mellitic acid and sodium mellate (the salt used for injectable solutions) are characterized by a remarkable absence of toxicity. Thus, in animal experimentation, toxicity tests controlled by pathological dissection of the organs of the test animals have shown that these products were strictly atoxic even in doses many times greater than the therapeutic dose, and in human tests it has been established that the products have been perfectly well tolerated in every instance.

The invention is illustrated by the following non-limitative products:

*Example I*

Compressed tablets each weighing 0.20 gram and containing 0.5 milligram of metallic acid are made up by known procedures to the following formulation:

|   | Grams |
|---|---|
| Mellitic acid | 0.0005 |
| Lactose (milk sugar) | 0.14 |
| Starch | 0.05 |
| Magnesium stearate | 0.0095 |
|   | 0.20 |

*Example II*

Injectable ampules each containing 0.5 milligram of mellitic acid are prepared by making up the following solution and then dividing it into 1 cc. parts and filling the same into ampoules in known manner:

| Mellitic acid | grams | 0.05 |
|---|---|---|
| Normal soda solution | cc. | 0.88 |
| Physiological saline solution containing 0.8% NaCl—to make 100 cc. total. | | |

In addition to compressed tablets and injectable ampules according to the foregoing examples, the said products can moreover be offered in any of the various other forms suitable for pharmaceutical and veterinary products, such as drinkable liquids, cachets, and suppositories. In the case of injectable liquids, these are preferably constituted, at least in part, by sodium mellate to obtain a pH suitable for injection. The active ingredient can also be mixed with other medicaments or veterinary feed or medicinal products in any desired oral or injectable form.

The invention is defined by the appended claims.

I claim:

1. A composition in unit dosage form for administration to animals and humans, the essential active constituent of which is selected from the group consisting of mellitic acid and its sodium salt, the said essential active constituent being combined with a vehicle therefor and the said dosage form being selected from the group consisting of oral and parenteral dosage forms, each dosage unit containing about 0.1–10 milligrams of the essential active constituent.

2. A composition in unit dosage form for administration to animals and humans, the essential active constituent of which is selected from the group consisting of mellitic acid and its sodium salt in the amount of 0.1–10 milligrams per dosage unit.

3. A composition in unit dosage form for administration to animals and humans, the essential active constituent of which as selected from the group consisting of mellitic acid and its sodium salt in the amount of 0.5 milligram per dosage unit.

4. An orally administrable composition having diuretic and choleretic properties comprising a vehicle containing a unit dose of 0.5 milligram of mellitic acid.

5. A compressed tablet weighing 0.20 gram and comprising a solid pharmaceutical carrier containing 0.5 milligram of mellitic acid.

6. An injectable solution containing 0.5 milligram of mellitic acid per 1 cc. of pharmaceutically acceptable vehicle made up of normal soda solution and physiological saline solution.

7. A suppository comprising a base in which is incorporated a substance selected from the group consisting of mellitic acid and sodium mellate.

8. A veterinary composition comprising animal feed containing a substance selected from the group consisting of mellitic acid and sodium mellate.

9. A method of effecting diuresis which comprises administering to asystolic, oliguric and edematous patients a substance selected from the group consisting of mellitic acid and sodium mellate in a carrier.

References Cited in the file of this patent

Merck Index, 1952, 6th ed., Merck and Co., Rahway, N.J., pp. 606 and 607.